United States Patent [19]
Keller et al.

[11] 3,991,535
[45] Nov. 16, 1976

[54] PRESSED-IN DOVETAIL TYPE JOINT

[76] Inventors: James R. Keller, 1410 NE. Marine Drive, Portland, Oreg. 97211; William A. Nickerson, 2615 NE. 36th St., Portland, Oreg. 97212

[22] Filed: Mar. 14, 1975

[21] Appl. No.: 558,350

[52] U.S. Cl. .................................. 52/642; 52/690; 52/753 T; 403/364; 403/381
[51] Int. Cl.² ................................................ E04B 1/32
[58] Field of Search ................. 52/729, 753 G, 690, 52/591, 753 B, 753 T, 730, 639

[56] References Cited
UNITED STATES PATENTS

| | | | |
|---|---|---|---|
| 710,389 | 9/1902 | Wright | 52/753 B |
| 1,212,073 | 1/1917 | Krueger | 52/730 X |
| 2,248,671 | 7/1941 | Hohl | 52/584 X |
| 2,981,669 | 4/1961 | Brand et al. | 52/594 UX |
| 3,490,188 | 1/1970 | Troutner | 52/690 X |

FOREIGN PATENTS OR APPLICATIONS

| 437,720 | 11/1967 | Switzerland | 52/729 |
|---|---|---|---|

*Primary Examiner*—Price C. Faw, Jr.
*Assistant Examiner*—Carl D. Friedman
*Attorney, Agent, or Firm*—Lee R. Schermerhorn

[57] ABSTRACT

The joint comprises a pair of parallel tongues of uniform thickness on an edge of one member which are pressed into grooves of uniform width in another member. The grooves are inclined from top to bottom relative to each other, bending the tongues out of parallelism and thereby locking them in the grooves to form a self-locking joint equivalent to a dovetail joint. Such tongues on the top and bottom edges of a vertical member are pressed into longitudinal grooves in elongated top and bottom chord members to form an I-beam or truss section. The tongues may be formed on the edge of a board or they may comprise the opposite face sheets on a plywood panel. Also, the joint members may be metal.

7 Claims, 9 Drawing Figures

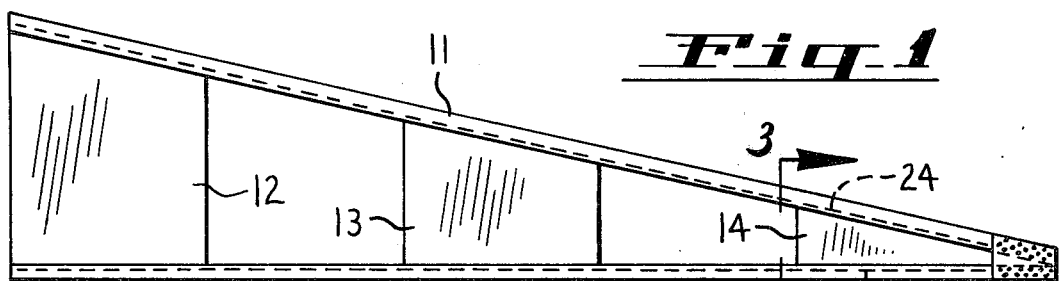
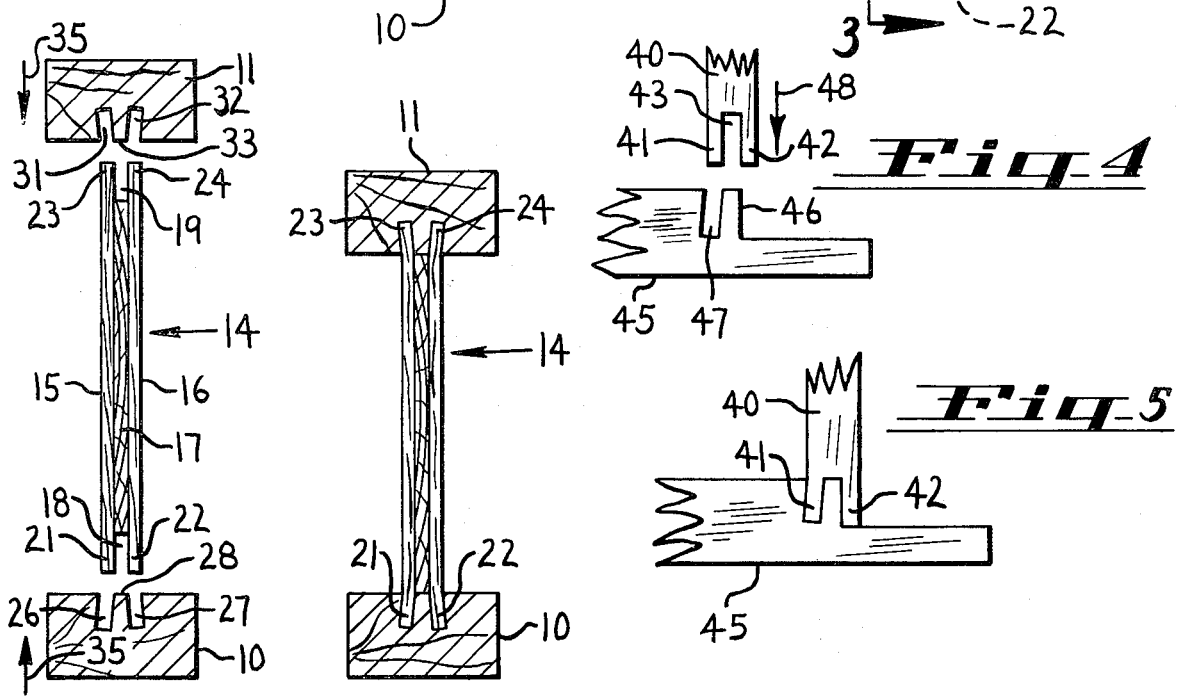
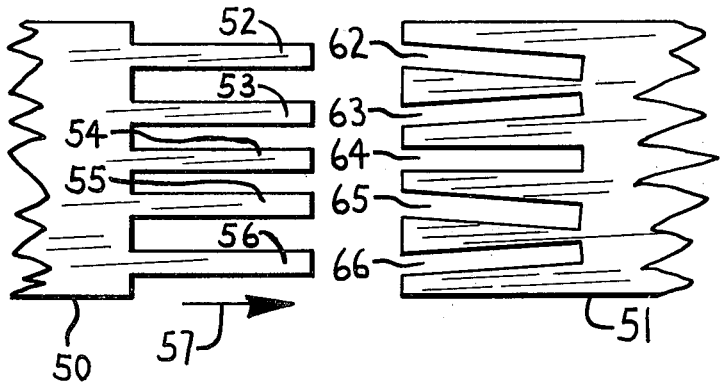
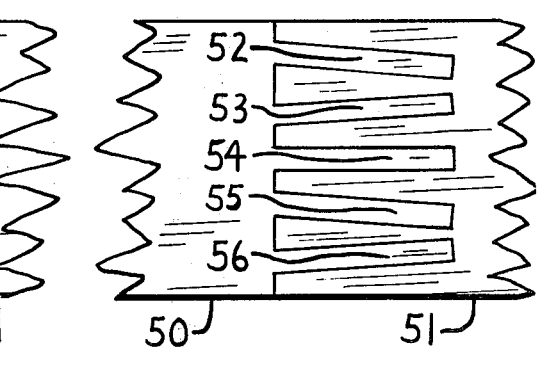

PRESSED-IN DOVETAIL TYPE JOINT

BACKGROUND OF THE INVENTION

This invention relates to a joint having the characteristics of a dovetail joint but which may be formed by merely pressing two interfitting members together.

The effectiveness of dovetail joints has long been recognized but such joints have had limited application because of their very nature. Also, the formation of the tapered tongues and grooves has been rather complicated and expensive, usually requiring special machines. Further, such joints are usually limited to wooden members which can be glued together and then clamps are required during the setting of the glue as with other types of glued joints. Production is limited by the work involved in the preparation of the interfitting parts, by the manipulations necessary to fit them together and by the setting time of the glue.

Objects of the present invention are, therefore, to provide an improved dovetail type joint, to provide a dovetail type joint of wide application, to provide a dovetail type joint which is not subject to the limitations of conventional dovetail joints, to provide a joint which is inherently self clamping, to provide a pressed-in dovetail type joint which is especially applicable to plywood and to provide such a joint which is also applicable to metal members.

SUMMARY OF THE INVENTION

In the present form of construction a pair of parallel tongues of uniform thickness is formed on an edge of one member which is to be joined to another member. The tongues are pressed into grooves of uniform width in the other member, the grooves being inclined relative to each other from top to bottom, bending the tongues out of parallelism and thereby locking them in the grooves to form the equivalent of a dovetail joint.

Such tongues on the top and bottom edges of a vertical member are pressed into longitudinal grooves in elongated top and bottom chord members to form an I-beam or truss section. The tongues may be formed on the edge of a board or they may comprise the opposite face sheets on a plywood panel. The joint is self clamping, allowing glue in the joint to set without external clamps. Also, the joint members may be metal, in which case no adhesive or other bonding is required.

The invention will be better understood and additional objects and advantages will become apparent from the following description of certain preferred embodiments illustrated on the accompanying drawing. Various changes may be made, however, in the details of construction and arrangement of parts and certain features may be used without others. All such modifications within the scope of the appended claims are included in the invention.

BRIEF DESCRIPTION OF THE DRAWING

FIG. 1 is a side elevation view of a section of roof truss embodying the invention;

FIG. 2 is a cross sectional view showing the method of assembly;

FIG. 3 is a view on the line 3—3 in FIG. 1;

FIG. 4 is a fragmentary view showing the method of forming a joint in a cabinet drawer according to the invention;

FIG. 5 is a view of the completed joint in FIG. 4;

FIG. 6 is a fragmentary view showing a method of splicing boards according to the invention;

FIG. 7 is a view of the completed joint in FIG. 6;

FIG. 8 shows a method for forming a joint between two metal members according to the invention; and FIG. 9 shows the completed joint in FIG. 8.

DESCRIPTION OF THE PREFERRED EMBODIMENTS

FIGS. 1, 2 and 3 show how the present joint is utilized to form a wood roof truss, as for example for a trailer home. The truss section comprises a lower wood chord member 10, an upper wood chord member 11 and a plurality of spaced apart wood web members 12, 13 and 14.

FIG. 2 shows the parts in position for assembly. Web member 14 comprises a piece of plywood having a pair of ⅛ inch thick face veneer sheets 15 and 16 in which the grain of the wood runs in a vertical direction, and a ⅛ inch thick core veneer sheet 17 in which the grain of the wood runs in a horizontal direction. The lower and upper edges of the panel are grooved at 18 and 19 to recess the edges of core sheet 17 between the face sheets, as shown.

Thus, the lower edge of face sheet 15 forms a tongue 21 and the lower edge of face sheet 16 forms a tongue 22, these tongues being of uniform thickness and parallel with each other. Similarly, on the upper edge of the panel, face sheet 15 forms a tongue 23 and face sheet 16 forms a tongue 24, these tongues also being of uniform thickness and parallel with each other. In the present example each tongue is ⅛ inch thick.

The upper surface of lower chord member 10 is grooved by a pair of dado cuts 26 and 27, each having a uniform width of ⅛ inch. At 28 on the upper surface of chord member 10 these dado cuts are ⅛ inch apart. Grooves 26 and 27 are divergent in a downward direction, each being inclined approximately 5° from a vertical plane.

Similar dado cuts are made in the under side of upper chord member 11 to form a pair of divergent grooves 31 and 32 each having a uniform width of ⅛ inch and inclined approximately 5° from a vertical plane. The grooves are spaced apart ⅛ inch throughout their length as indicated at 33.

The entrances to the four grooves 26, 27, 31 and 32 are aligned with the respective tongues 21, 22, 23 and 24 so that the tongues may be inserted into the grooves and the parts pressed together as indicated by arrows 35. When the chord members are pressed toward each other the tongues penetrate into the grooves causing the tongues of each adjacent pair to be bent outwardly away from each other as shown in FIG. 3. This divergent bending of the tongues produces a self-locking joint similar to a conventional dovetail joint.

Even though the joints are self-locking it is preferred to apply glue to the joint surfaces to provide a glued joint. The inherent self-locking nature of the joints makes them self-clamping so that external clamps are not necessary while the glue is setting.

Using standard plywood panels, each web member 12, 13 and 14 is four feet wide and the truss section may be of any required length. The web members may be spaced apart any desired distance to provide an interrupted web, or they may abut each other, as strength and other considerations may require.

The same technique may be used to make a wood I-beam, the only difference being that upper chord member 11 would then be parallel with lower chord member 10 and the web members 12, 13 and 14 would not be tapered. As in the present truss, the web members may be spaced apart from each other, or they may abut each other to provide the effect of a single continuous web member.

For either truss or I-beam the web members are not required to be of plywood. Plain boards may also be used, with the grain of the wood running in a vertical direction so that the grooves in the chord members bend the tongues of the web members transversely of the grain.

The dimensions specified above are given by way of example and not in a limiting sense.

The present joint may also be used to advantage in cabinet drawer construction as shown in FIGS. 4 and 5. Drawer member 40 has on one edge a pair of parallel tongues 41 and 42 separated by a groove or dado cut 43. Member 40 may be a plain board or it may be plywood as in FIG. 2 but in either case the grain of the wood in the tongue 41 must run in a vertical direction as viewed in FIG. 4. Tongue 41 is of uniform thickness.

Member 45 is provided with a flat guide surface 46 to engage the inside surface of tongue 42 and an inclined dado cut or groove 47 of uniform width to receive tongue 41. Groove 47 is inclined approximately 5° relative to guide surface 46 so as to bend the tongue 41 and form a self-locking joint when the two members are pressed together as indicated by arrow 48. FIG. 5 shows the completed joint. Preferably glue is applied to the joint surfaces before the parts are pressed together. The self-locking nature of the joint makes it self-clamping so that external clamps are not required while the glue is setting.

FIGS. 6 and 7 shows how the present type of joint may be utilized to splice together end-to-end a pair of boards or timbers 50 and 51. One end of member 50 is provided with a plurality of parallel tongues each of uniform thickness as indicated at 52–56. As indicated by the arrow 57 these tongues are pressed into grooves 62–66 of uniform width in one end of member 51. The thickness of the tongues corresponds to the width of the grooves and the tongues are spaced apart to register with the entrances to the respective grooves.

Grooves 62 and 63 converge and grooves 65 and 66 form a second pair of converging grooves. Groove 64 is parallel with tongue 54 and with respect to adjacent grooves 63 and 65 the groove 64 provides guide surfaces equivalent to the perpendicular guide surface 46 in FIG. 4. Each groove 62, 63, 65 and 66 is preferably inclined approximately 5° from the direction of the tongue which it is to receive.

FIG. 7 shows the resulting self-interlocking dovetail type joint. The joint surfaces are preferably glue coated before assembly of the joint. The self-locking nature of the joint makes it self-clamping so that external clamps are not required while the glue is setting.

FIGS. 8 and 9 show how the present joint may be used to connect a pair of metal members 70 and 71. One edge of member 70 is provided with a pair of parallel tongues 72 and 73 of uniform thickness. Member 71 is provided with a pair of grooves 74 and 75 of uniform width having entrance openings arranged to register with the ends of the tongues so that the tongues may be pressed into the grooves as indicated by arrow 76. Each groove is inclined at an angle of approximately 5° relative to the direction of the tongue which it is to receive. In the present illustration the grooves are divergent from top to bottom but they may converge, if desired, as do the upper and lower pairs of grooves in FIG. 6.

When the tongues are pressed into the grooves the grooves bend the tongues to form a self-interlocking joint as shown in FIG. 9. The metal of the tongues must therefore be sufficiently ductile or swagable to conform to the grooves without cracking or breaking. Metals such as aluminum and copper are well adapted for this type of joint but various other metals may also be used.

The pressing operation produces a strong connection without any adhesive, welding, soldering or brazing. The pressing operation may also upset the metal in the tongues to some extent causing the metal to flow and tightly fill the grooves, eliminating any crevises or voids between the tongues and the grooves.

In all the embodiments described above, the present direct pressing action, wherein bendable tongues on one member are deflected to fit inclined grooves in another member, is to be clearly distinguished from conventional dovetail joints wherein two parts merely interfit and interlock without any deformation of either part.

Having now described the invention and in what manner the same is to be used, what is claimed as new and desired to protect by Letters Patent is:

1. A structural load bearing member comprising a pair of elongated chord members of wood material and a plywood web member interconnecting said chord members by means of glued tongue and groove joints, said plywood web member having at least two layers of veneer in which the grain of the wood runs approximately perpendicular to the length of said chord members and having at least one intervening layer of veneer in which the grain of the wood runs approximately parallel with the length of said chord members, said two layers of veneer projecting beyond said intervening layer on two opposite edges of said web member to form a pair of parallel spaced apart bendable tongues on each of said opposite edges, and a pair of longitudinal grooves in each of said chord members spaced apart to receive said tongues, said grooves in each chord member being inclined from top to bottom relative to each other to bend said tongues out of parallelism with each other and form a self-locking dovetail type joint when said chord members are pressed onto said web member, said joints holding said members together in assembled relation without external clamps while said glue is setting.

2. A structural member as defined in claim 1 wherein said grooves of each pair are divergent from each other from top to bottom.

3. A structural member as defined in claim 1 wherein said chord members are non-parallel, to form a truss.

4. A structural member as defined in claim 1 wherein said chord members are parallel with each other.

5. A structural member as defined in claim 1 wherein a plurality of said web members are spaced apart from each other longitudinally of said chord members.

6. A pressed-in, self-locking dovetail type joint uniting two members of wood material, one of said members having five parallel bendable tongues extending therefrom in side by side relation, the other of said members having a first pair of grooves receiving a first pair of said tongues, a second pair of grooves receiving a second pair of said tongues and a fifth groove between said first and second pairs of grooves receiving the fifth tongue, the grooves of said first and second pairs being inclined from top to bottom relative to each other causing said first and second pairs of tongues to bend out of parallelism with each other and lock themselves in said grooves when said two members are pressed together, and said fifth groove being a guide groove receiving said fifth tongue without bending said fifth tongue.

7. A pressed-in, self-locking dovetail type joint uniting two planar members of wood material in right angle relationship, one of said members having a pair of tongues extending along one edge thereof parallel to the plane of the member, the other of said members having a guide surface engaging the side of one tongue which confronts the other tongue and a groove receiving said other tongue, said groove being inclined from top to bottom relative to said guide surface causing said other tongue to bend out of parallelism with said one tongue and lock said other tongue in said groove when said two members are pressed together.

* * * * *